US011535277B2

(12) United States Patent
    Zhu

(10) Patent No.: US 11,535,277 B2
(45) Date of Patent: Dec. 27, 2022

(54) DUAL BUFFER SYSTEM TO ENSURE A STABLE NUDGE FOR AUTONOMOUS DRIVING VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 222 days.

(21) Appl. No.: 16/788,300

(22) Filed: Feb. 11, 2020

(65) Prior Publication Data
    US 2021/0245782 A1    Aug. 12, 2021

(51) Int. Cl.
    *B60W 60/00*    (2020.01)
    *G05D 1/00*     (2006.01)
    *G05D 1/02*     (2020.01)

(52) U.S. Cl.
    CPC ....... *B60W 60/0015* (2020.02); *G05D 1/0088* (2013.01); *G05D 1/0214* (2013.01); *B60W 2554/4026* (2020.02); *B60W 2554/4029* (2020.02); *G05D 2201/0213* (2013.01)

(58) Field of Classification Search
    None
    See application file for complete search history.

(56) References Cited

U.S. PATENT DOCUMENTS

2020/0180618 A1\* 6/2020 Ohmura ................... G08G 1/16
2020/0317192 A1\* 10/2020 Awane ............... B60W 50/0225

FOREIGN PATENT DOCUMENTS

WO     WO-2021136130 A1 \* 7/2021 ................ B64F 1/18

\* cited by examiner

*Primary Examiner* — Sze-Hon Kong
*Assistant Examiner* — Davin Seol
(74) *Attorney, Agent, or Firm* — Womble Bond Dickinson (US) LLP

(57) ABSTRACT

Embodiments described herein disclose systems and methods for a dual buffer zone system to ensure a stable nudge for autonomous driving vehicles. In one embodiment, a system perceives a driving environment surrounding an autonomous driving vehicle (ADV), including perceiving one or more obstacles within a view of the ADV. For each of the one or more obstacles, if a previous planning decision for the obstacle is not a nudge, the system associates a first buffer zone with the obstacle. Otherwise, the system associates a second buffer zone with the obstacle. Based on the associated buffer zone for the obstacle, the system determines a planning decision to nudge the obstacle to ensure a buffer distance between the ADV and the obstacle. The system generates a trajectory for the ADV based on the planning decisions for the one or more obstacles.

17 Claims, 8 Drawing Sheets

DUAL BUFFER SYSTEM TO ENSURE A STABLE NUDGE FOR AUTONOMOUS DRIVING VEHICLES

TECHNICAL FIELD

Embodiments of the present disclosure relate generally to operating autonomous vehicles. More particularly, embodiments of the disclosure relate to a method for a dual buffer system to ensure a stable nudge for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

An autonomous driving vehicle (ADV) relies on real-time traffic and local environment data detected by sensors to plan an optimal route in each planning phase. Obstacles (e.g., objects and nearby vehicles) in the perceived area of an ADV can impact the planning of the ADV. Obstacles perceived in front of the vehicle, e.g., front left and right sides, can impact the planning of the ADV from a nudge decision to a yield decision, and vice versa. If the planning decision is at a boundary condition, the planning decision can rapidly toggle between planning cycles from a nudge to not a nudge, and vice versa. Therefore, it would be desirable to eliminate the possibility of rapid toggles at the boundary condition to stabilize a nudge.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments described herein disclose systems and methods for a dual buffer zone system to ensure a stable nudge for autonomous driving vehicles. In one embodiment, a system perceives a driving environment surrounding an autonomous driving vehicle (ADV), including perceiving one or more obstacles within a view of the ADV. For each of the one or more obstacles, if the obstacle is perceived for a first time or a previous planning decision for the obstacle is not a nudge, the system associates a first buffer zone with the obstacle. Otherwise, the system associates a second buffer zone with the obstacle. Based on the associated buffer zone for the obstacle, the system determines a planning decision to nudge the obstacle to ensure a buffer distance that of the associated buffer zone between the ADV and the obstacle. The system generates a trajectory for the ADV based on the planning decisions for the one or more obstacles.

Figure 1:
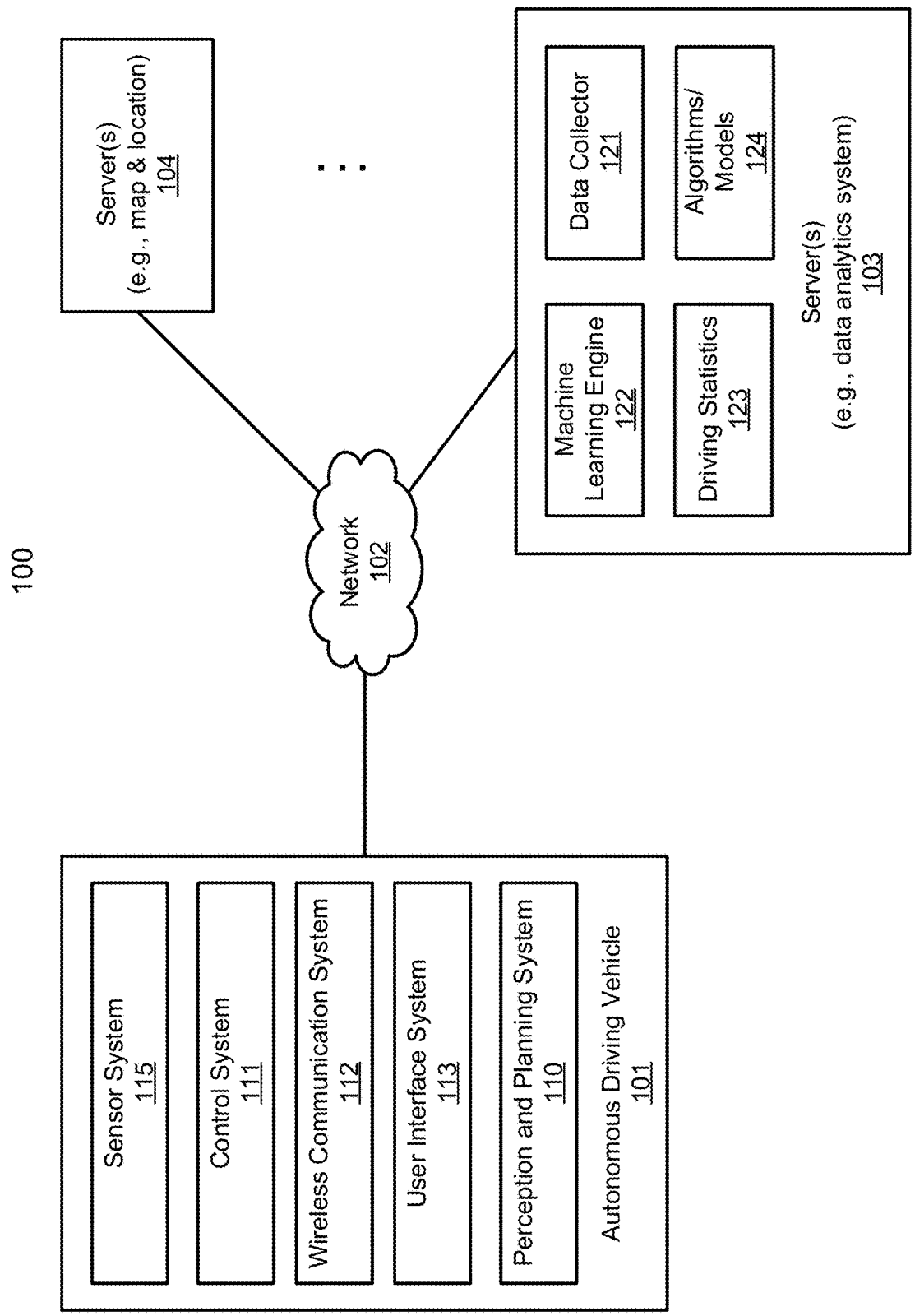
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
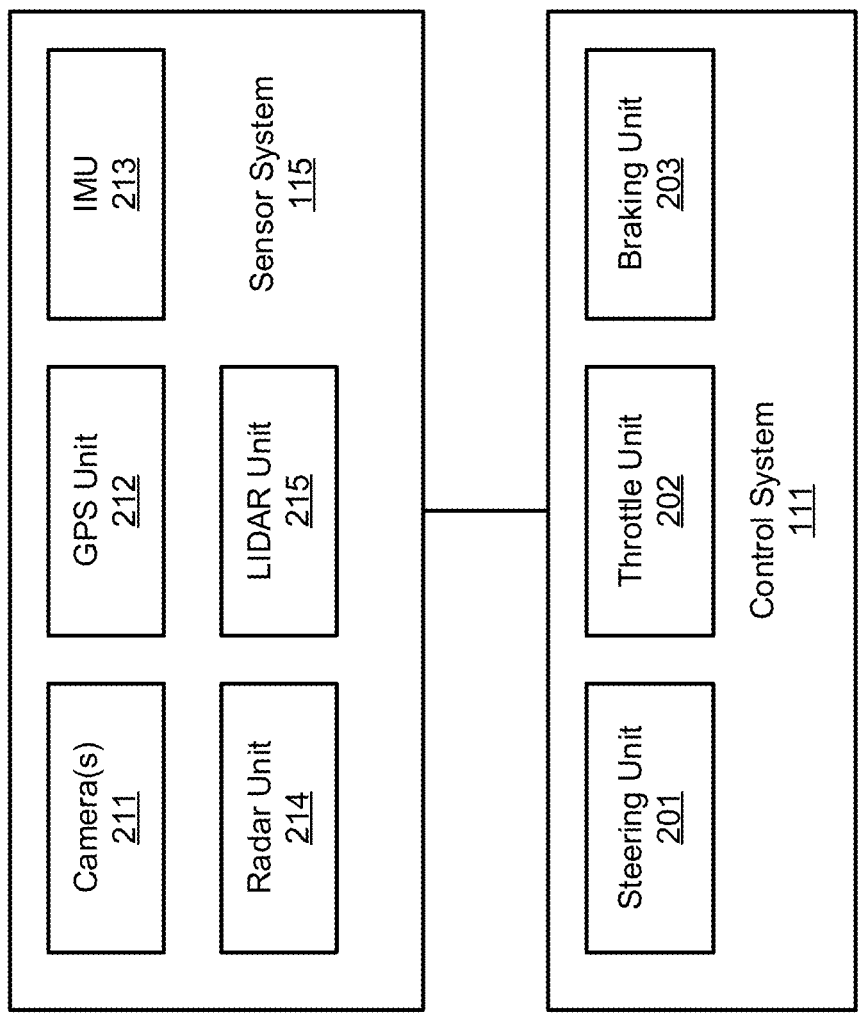
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include algorithms for nudging an obstacle using dual buffer zones. Algorithms 124 can then be uploaded on ADVs to be utilized during autonomous driving in real-time.

Figure 3A:
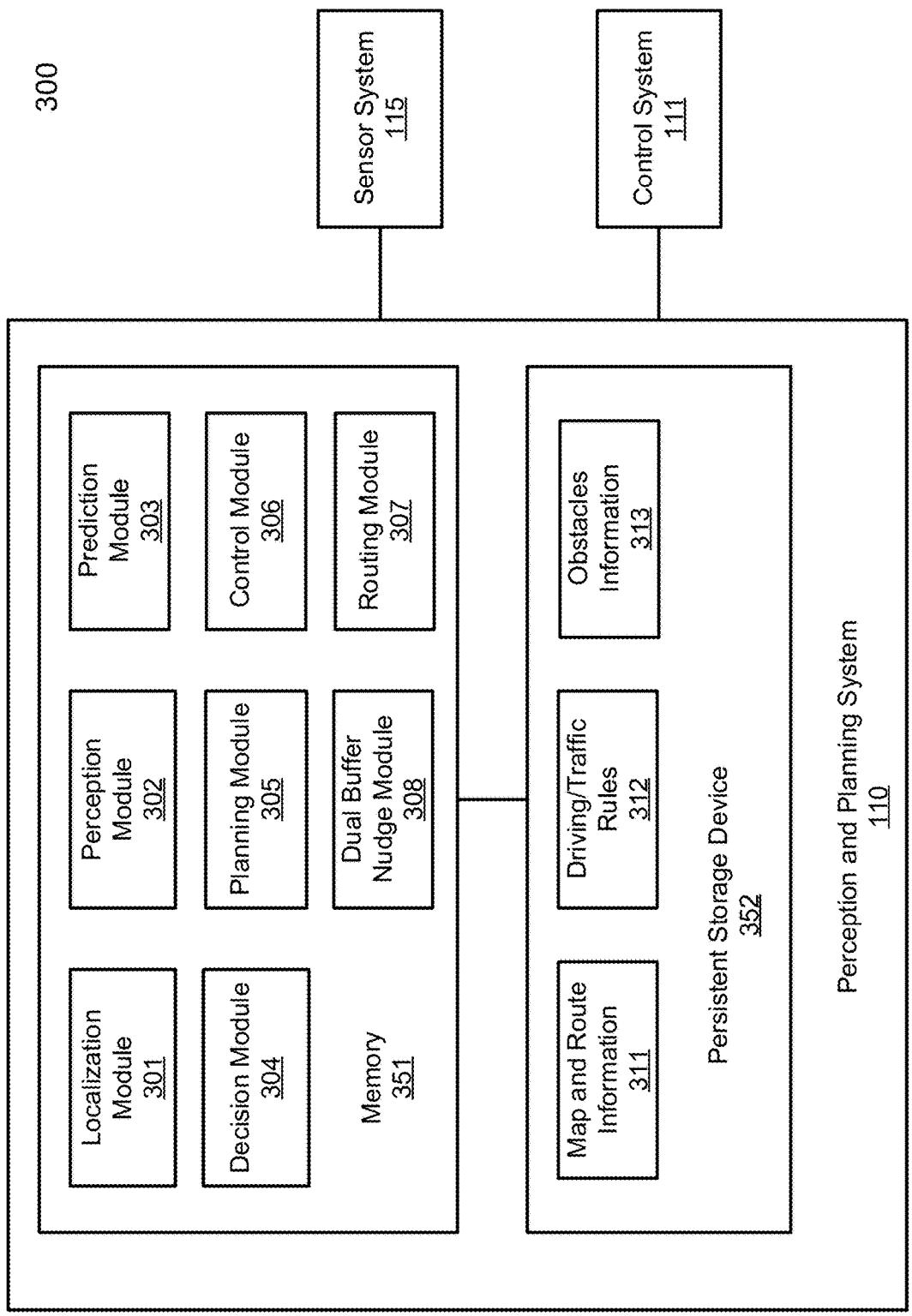
FIGS. 3A-3B are block diagrams illustrating an example of a perception and planning system used with an autonomous vehicle according to one embodiment.
Figure 3B:
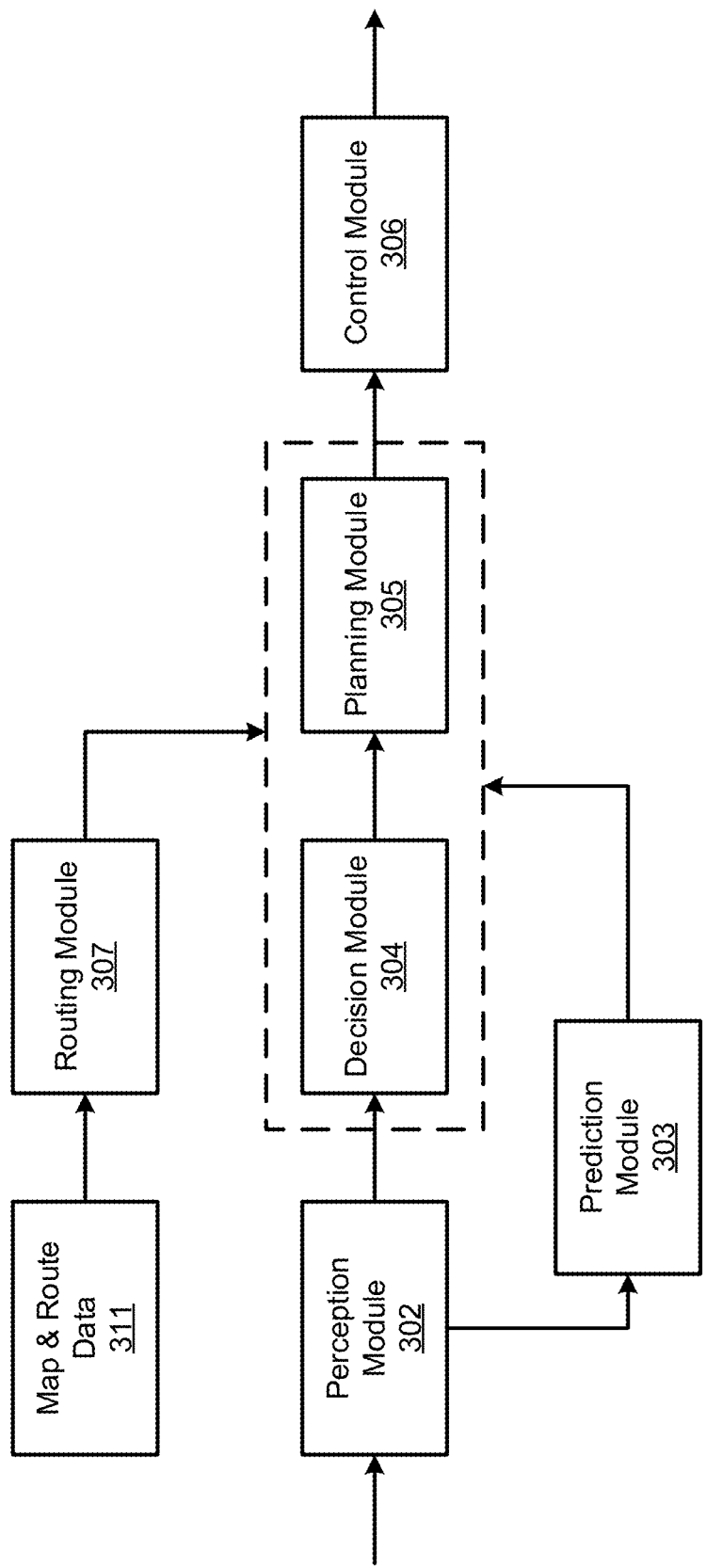

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and dual buffer nudge module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Dual buffer nudge module 308 can be used to identify a set of obstacles in a perceived area of the ADV. The dual buffer nudge module 308 can track and associate dual buffer zones (e.g., a first or a second buffer zone) to obstacles to determine planning decisions based on the obstacles having the dual buffer zones. The dual buffer nudge module 308 can generate a trajectory for the ADV to nudge or not to nudge (e.g., to yield/follow/avoid/stop) an obstacle to avoid cycling between outputs (e.g., to nudge or not to nudge) when the planning decisions are near a boundary condition of nudge and not to nudge.

Figure 4:
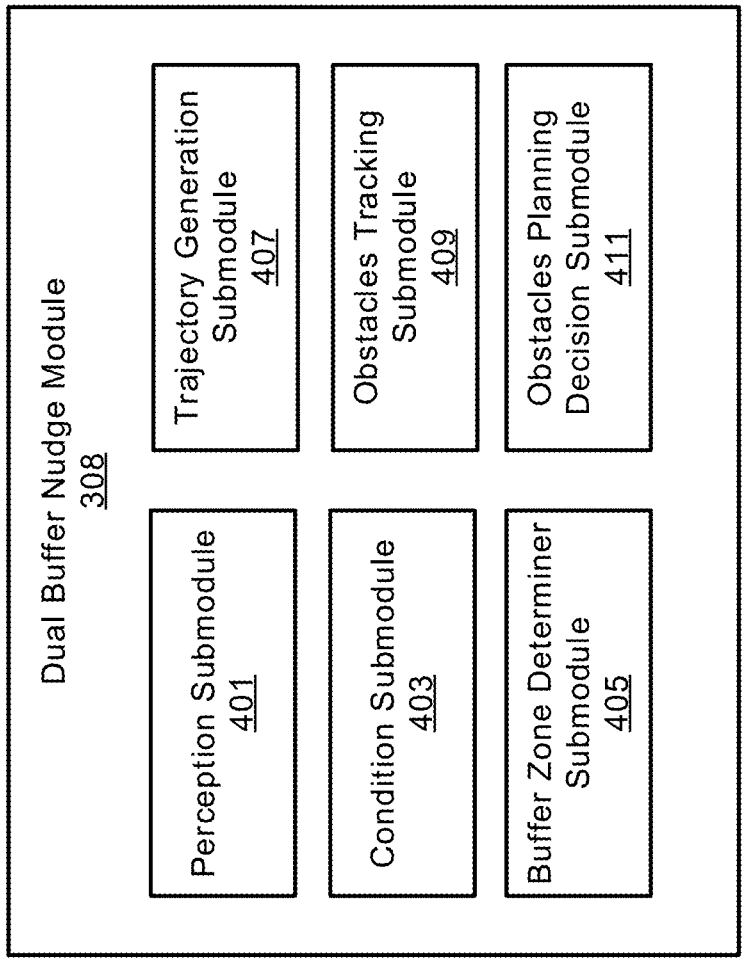
FIG. 4 illustrates a block diagram of a dual buffer nudge module according to one embodiment.

FIG. 4 illustrates a block diagram of a dual buffer nudge module according to one embodiment. Dual buffer nudge module 308 can apply a dual buffer zone for an obstacle. The buffer zone can include a first buffer zone having a first predetermined buffer size to a left and to a right of the obstacle, and a second buffer zone having a second predetermined buffer size to a left and to a right of the obstacle. In one embodiment, dual buffer nudge module 308 includes submodules such as, perception submodule 401, condition submodule 403, buffer zone determiner submodule 405, trajectory generation submodule 407, obstacles tracking submodule 409, and obstacles planning decision submodule 411. Perception submodule 401 can perceive and identify one or more obstacles in a view of the ADV. For example, submodule 401 can capture obstacles using one or more image capturing devices, such as cameras, time-of-flight cameras, LIDAR, RADAR, in a planning direction of the ADV. Condition submodule 403 can determine if some conditions are satisfied so to apply a dual buffer zone for the identified obstacle. The conditions can include a condition that an obstacle is newly identified, or the planning decision associated with the obstacle was a nudge for a previous planning cycle. Buffer zone determiner submodule 405 can determine the characteristics of one or more buffer zones. Buffer zone determiner submodule 405 can apply a first buffer zone or a second buffer zone of the one or more buffer zones to the identified obstacles based on the determined conditions to avoid rapidly cycling between nudge/not_a_nudge outputs. Trajectory generation submodule 407 can generate a trajectory based on a planning decision for the ADV. Obstacles tracking submodule 409 can track previously and newly obstacles identified by the ADV. Obstacles planning decision submodule 411 can determine whether to nudge or not to nudge an obstacle associated with a buffer zone.

Figure 5A:
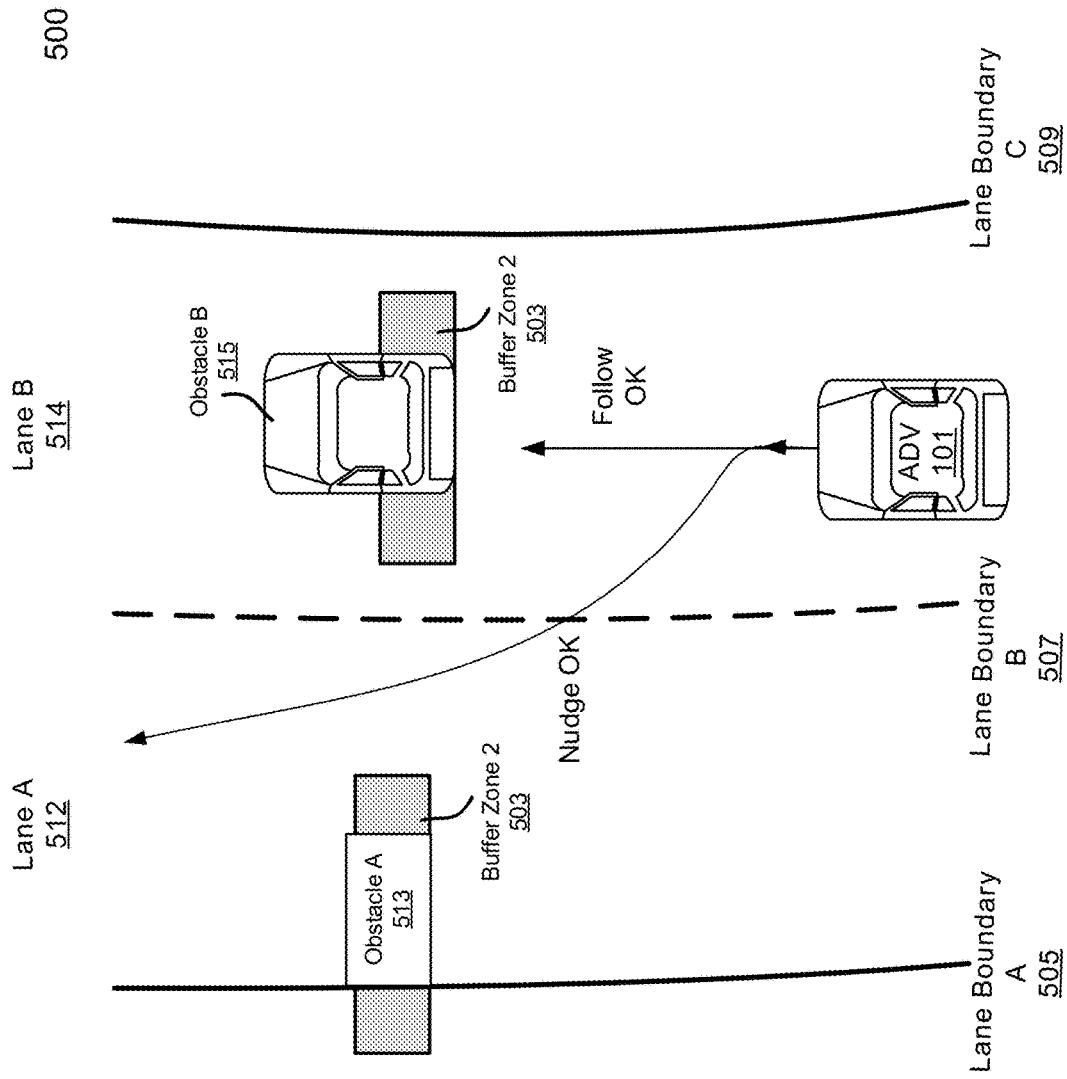
FIG. 5A is an exemplary diagram showing an ADV having a buffer zone according to an embodiment.

FIG. 5A is an exemplary diagram showing an ADV having a buffer zone according to an embodiment. FIG. 5A shows scenario 510 where an ADV 101 is travelling in a lane B 514 on a two-lane road, the two-lane road includes lane A 512 and lane B 514, and a number of lane boundaries 505-509.

ADV 101 can identify and track one or more obstacles within a view of ADV 101. ADV 101 can also identify a subset of the obstacles that affects a planning decision of ADV 101. In this example, obstacle A 513 and obstacle B 515 have been identified as obstacles affecting a planning decision of the ADV 101. Obstacle A 513 can be a boulder, a blockade, a vehicle, a person/pedestrian, a bicycle, a motorcycle, or a moving object etc. situated in lane A 512. Obstacle B 515 is a vehicle in front of ADV 101. As shown in FIG. 5A, obstacle A 513 and B 515 are associated with a buffer zone 2 503. The buffer zone 2 can have a predetermined size extension to a left and to a right of the respective obstacle. In one embodiment, buffer zone 2 includes an approximately 60 centimeters extension to a left and an approximately 60 centimeters extension to a right of the respective obstacle. In one embodiment, the size extensions can be uneven for the left and the right sides. Based on the buffer zones 503, ADV 101 has enough spacing to nudge (or approach/pass) to a left of obstacle B 515 or to a right of the obstacle A 513) obstacle A 513 and/or obstacle B 515, or not nudge obstacle A 513 and/or obstacle B 515. A planning decision to not nudge includes a planning decision to avoid, follow, stop, yield for an obstacle. In this case, not nudge obstacle A 513/obstacle B 515 includes a planning decision to follow obstacle B 515. Following obstacle B 515 is maneuvering ADV 101 at a speed approximate a speed of obstacle B 515 following a path of obstacle B 515.

While either condition (nudge or not to nudge) is satisfactory, ADV 101 may select the planning decision to nudge if obstacle B 515 is slowing down or is moving much slower than the speed limit of the road or a map information (such as map information 311 of FIG. 3A) indicates ADV 101 should nudge. If there is a marginal spacing between the buffer zones 503 of obstacle A 513 and obstacle B 515 to nudge, the localization module 301 and perception module 302 of ADV 101 (which has some margin of error in performing its respective calculations) may cause the ADV to toggle between planning decisions to nudge and not to nudge between planning cycles.

Figure 5B:
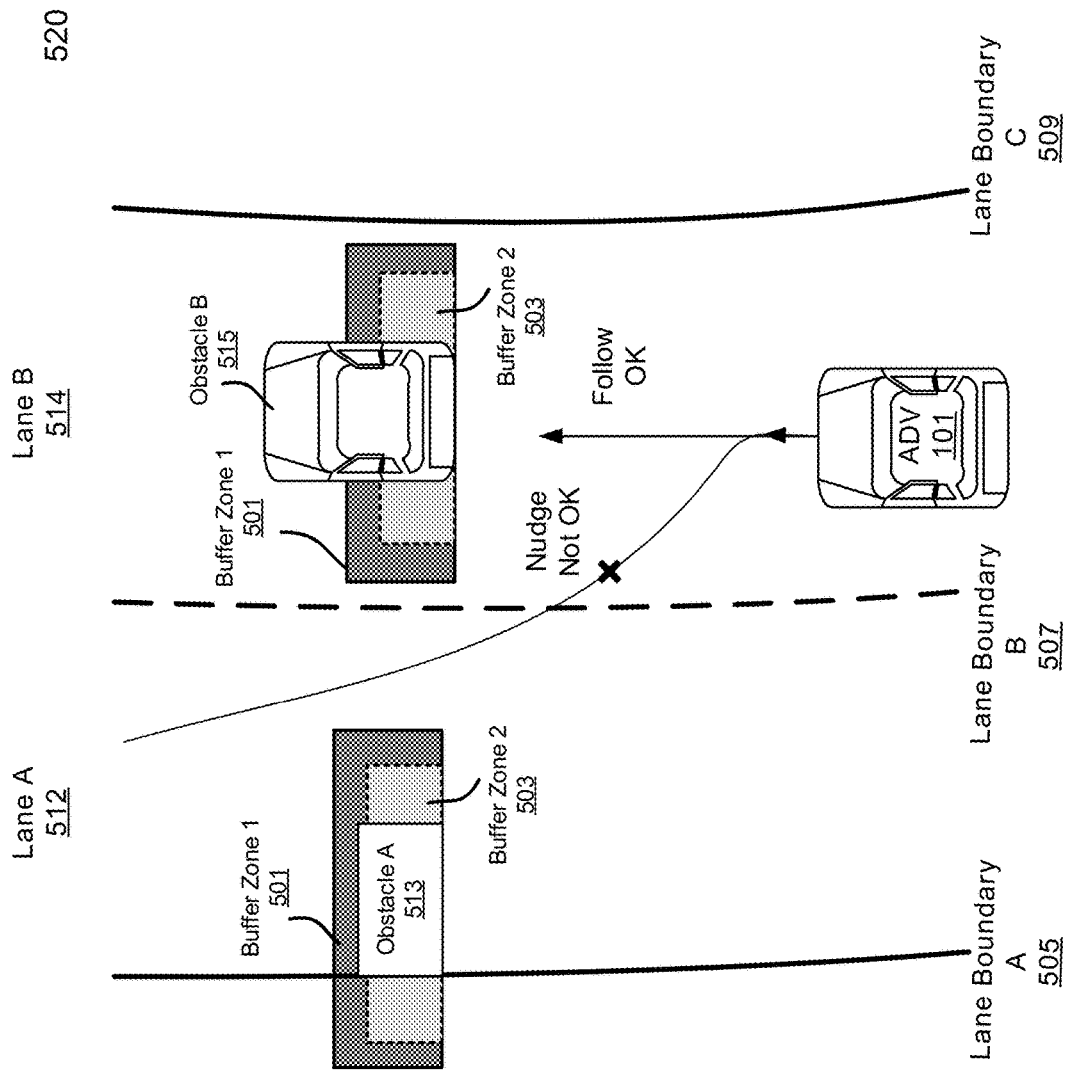
FIG. 5B is an exemplary diagram showing an ADV having dual buffer zones according to an embodiment.

FIG. 5B is an exemplary diagram showing an ADV having dual buffer zones according to an embodiment. Referring to FIG. 5B, scenario 520 illustrates obstacles A 513 and obstacles B 515 are each associated with Buffer Zone 1 501 instead of Buffer Zone 2 503. In this case, Buffer Zone 1 includes an extension approximately 70 centimeters to a left and approximately 70 centimeters to a right of the respective obstacle. E.g., Buffer Zone 1 501 is larger than Buffer Zone 2 503 by a predetermined length of approximately 10 centimeters. The condition to associate with Buffer Zone 1 may include a condition that the respective obstacle appeared for the first time (e.g., previous planning cycle is void of the obstacle) or the last planning cycle of path decision is not a nudge. Here, the planning decision to nudge an obstacle can be carried forward for a next planning decision cycle for the obstacle. Otherwise, the obstacles may be associated with Buffer Zone 2.

In this case, the expanded Buffer Zone 1 (e.g., Buffer Zone 1 501 in comparison with Buffer Zone 2 503) surrounding the obstacle ensures the nudge condition is genuine, e.g., not caused by a margin of error of calculations of the ADV 101, e.g., the localization module 301 and/or perception module 302 of ADV 101 have some margin of error. Further, a planning decision not to nudge, results in an enlarged buffer zone, e.g., Buffer Zone 1 501, which in turn causes the planning decision to remain as "not to nudge". This way, the planning decision, even at a boundary spacing condition for a nudge, would not oscillate a planning output between a nudge and not a nudge.

In one embodiment, a buffer zone of an obstacle may include a polygonal representation (e.g., rectangle, square, hexagon, octagon, etc.) representative of the respective obstacle. The representation ensures there is a safe distance between the obstacle and ADV 101. In one embodiment, ADV 101 tracks all perceived obstacles or a subset of obstacles affecting a planning decision for a predetermined period of time. This way, ADV 101 can determine if a perceived obstacle is identified for a first time. The tracking information can further be stored in memory or in persistent storage of ADV 101, such as obstacles information 313 of FIG. 3A. In one embodiment, any identified obstacles affecting a planning decision is tagged with an obstacle identifier. In one embodiment, an obstacle that disappears for a predetermined period of time, and reappears from a view of ADV 101, may be identified as a new obstacle. In one embodiment, an obstacle disappearing for one or two planning cycles and reappears may be viewed as the same obstacle.

Figure 6:
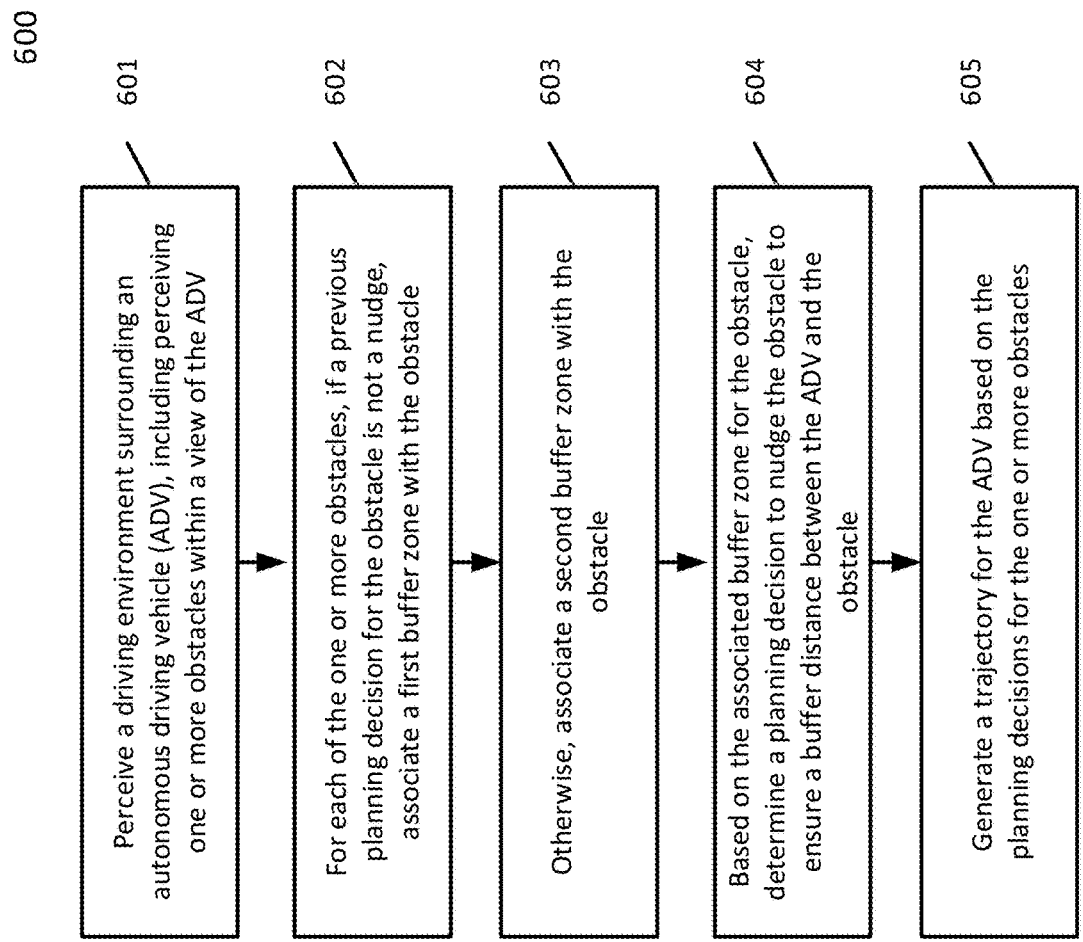
FIG. 6 illustrates a method to operate an autonomous driving vehicle according to an embodiment.

FIG. 6 illustrates a method to operate an autonomous driving vehicle according to an embodiment. Process 600 may be performed by processing logic which may include software, hardware, or a combination thereof. For example, process 600 may be performed by dual buffer nudge module 308 of FIG. 4. Referring to FIG. 6, at block 601, processing logic perceives a driving environment surrounding an autonomous driving vehicle (ADV), including perceiving one or more obstacles within a view of the ADV. At block 602, for each of the one or more obstacles, if a previous planning decision for the obstacle is not a nudge, processing logic associates a first buffer zone (e.g., Buffer Zone 1 501 of FIG. 5B) with the obstacle. Otherwise, at block 603, processing logic associates a second buffer zone (e.g., Buffer Zone 2 503 of FIG. 5A) with the obstacle. At block 604, based on the associated buffer zone (e.g., Buffer Zone 1 or Buffer Zone 2) for the obstacle, processing logic determines a planning decision to nudge the obstacle to ensure a buffer distance that of the associated buffer zone between the ADV and the obstacle. At block 605, processing logic generates a trajectory for the ADV based on the planning decisions for the one or more obstacles.

In one embodiment, the planning decision to nudge the obstacle is carried forward for a next planning decision cycle for the obstacle. In one embodiment, processing logic further tracks an obstacle for a predetermined number of planning cycles or until the obstacle is no longer within a view of the ADV. Processing logic determines if an obstacle is perceived for a first time. If the obstacle is perceived for the first time, processing logic associates the first buffer zone (e.g., Buffer Zone 1 501 of FIG. 5B) with the obstacle.

In one embodiment, the first buffer zone extends the obstacle approximately 70 centimeters to a left and approximately 70 centimeters to a right of the obstacle to provide a buffer distance between the ADV and the obstacle. In one embodiment, the second buffer zone extends the obstacle approximately 60 centimeters to a left and approximately 60 centimeters to a right of the obstacle to provide a buffer distance between the ADV and the obstacle different than the first buffer zone.

In one embodiment, the planning decision to nudge an obstacle includes a planning decision to pass to a left or to a right of the obstacle. In one embodiment, the planning decision not to nudge an obstacle includes a planning decision to yield, to avoid, to follow, or to stop for the obstacle. In one embodiment, the first or second buffer zone associated with an obstacle appears as a polygon to the ADV.

In one embodiment, each of the one or more obstacles is one of a vehicle, a person, a bicycle, a motorcycle, or a moving object. In one embodiment, the ADV determines whether to nudge an obstacle by the ADV is based at least on map information of the ADV.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this disclosure. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   perceiving, by a processor, a driving environment surrounding an autonomous driving vehicle (ADV), including perceiving one or more obstacles within a view of the ADV;
   for an obstacle of the one or more obstacles,
      tracking the obstacle for a predetermined number of planning cycles or until the obstacle is no longer within the view of the ADV;
      determining if the obstacle is perceived for a first time;
      if the obstacle is perceived for the first time, associating a first buffer zone with the obstacle;
      if a previous planning decision for the obstacle is not a nudge decision, associating the first buffer zone with the obstacle;
      otherwise, associating a second buffer zone with the obstacle; and
      based on the associated buffer zone for the obstacle, determining a current planning decision to nudge the obstacle to ensure a buffer distance between the ADV and the obstacle;
   generating, by the processor, a trajectory for the ADV based on the current planning decision for the one or more obstacles; and
   controlling, by the processor, the ADV to navigate according to the trajectory.

2. The method of claim 1, wherein the current planning decision to nudge the obstacle is carried forward for a next planning cycle for the obstacle.

3. The method of claim 1, wherein the first buffer zone extends the obstacle 70 centimeters to a left and 70 centimeters to a right of the obstacle to provide the buffer distance between the ADV and the obstacle.

4. The method of claim 1, wherein the second buffer zone extends the obstacle 60 centimeters to a left and 60 centimeters to a right of the obstacle to provide the buffer distance between the ADV and the obstacle.

5. The method of claim 1, wherein the planning decision to nudge an obstacle includes a planning decision to pass to a left or to a right of the obstacle.

6. The method of claim 1, wherein the planning decision not to nudge an obstacle includes a planning decision to yield, to avoid, to follow, or to stop for the obstacle.

7. The method of claim 1, wherein the first or second buffer zone associated with an obstacle appears as a polygon to the ADV.

8. The method of claim 1, wherein each of the one or more obstacles is one of a vehicle, a person, a bicycle, a motorcycle, or a moving object.

9. The method of claim 1, wherein the ADV determines whether to nudge an obstacle by the ADV is based at least on map information of the ADV.

10. A non-transitory machine-readable medium having instructions stored therein, which when executed by a processor, causing the processor to perform operations, the operations comprising:
   perceiving a driving environment surrounding an autonomous driving vehicle (ADV), including perceiving one or more obstacles within a view of the ADV;
   for an obstacle of the one or more obstacles,
      tracking the obstacle for a predetermined number of planning cycles or until the obstacle is no longer within the view of the ADV;
      determining if the obstacle is perceived for a first time;
      if the obstacle is perceived for the first time, associating a first buffer zone with the obstacle;
      if a previous planning decision for the obstacle is not a nudge decision, associating the first buffer zone with the obstacle;
      otherwise, associating a second buffer zone with the obstacle; and based on the associated buffer zone for the obstacle, determining a current planning decision to nudge the obstacle to ensure a buffer distance between the ADV and the obstacle;

generating a trajectory for the ADV based on the current planning decision for the one or more obstacles; and controlling the ADV to navigate according to the trajectory.

11. The non-transitory machine-readable medium of claim 10, wherein the current planning decision to nudge the obstacle is carried forward for a next planning decision cycle for the obstacle.

12. The non-transitory machine-readable medium of claim 10, wherein the first buffer zone extends the obstacle 70 centimeters to a left and 70 centimeters to a right of the obstacle to provide the buffer distance between the ADV and the obstacle.

13. The non-transitory machine-readable medium of claim 10, wherein the second buffer zone extends the obstacle 60 centimeters to a left and 60 centimeters to a right of the obstacle to provide the buffer distance between the ADV.

14. A data processing system, comprising:
a processor; and
a memory coupled to the processor to store instructions, which when executed by a processor, causing the processor to perform operations, the operations comprising:
perceiving a driving environment surrounding an autonomous driving vehicle (ADV), including perceiving one or more obstacles within a view of the ADV;
for an obstacle of the one or more obstacles,
tracking the obstacle for a predetermined number of planning cycles or until the obstacle is no longer within the view of the ADV;
determining if the obstacle is perceived for a first time;
if the obstacle is perceived for the first time, associating a first buffer zone with the obstacle;
if a previous planning decision for the obstacle is not a nudge decision, associating the first buffer zone with the obstacle;
otherwise, associating a second buffer zone with the obstacle; and
based on the associated buffer zone for the obstacle, determining a current planning decision to nudge the obstacle to ensure a buffer distance between the ADV and the obstacle;

generating a trajectory for the ADV based on the current planning decision for the one or more obstacles; and controlling the ADV to navigate according to the trajectory.

15. The system of claim 14, wherein the current planning decision to nudge the obstacle is carried forward for a next planning decision cycle for the obstacle.

16. The system of claim 14, wherein the first buffer zone extends the obstacle 70 centimeters to a left and 70 centimeters to a right of the obstacle to provide the buffer distance between the ADV and the obstacle.

17. The system of claim 14, wherein the second buffer zone extends the obstacle 60 centimeters to a left and 60 centimeters to a right of the obstacle to provide the buffer distance between the ADV.

* * * * *